(12) United States Patent
Suzumura et al.

(10) Patent No.: US 7,567,863 B2
(45) Date of Patent: Jul. 28, 2009

(54) VEHICLE STABILITY CONTROL DEVICE

(75) Inventors: Masato Suzumura, Susono (JP); Kenji Asano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 410 days.

(21) Appl. No.: 10/560,779

(22) PCT Filed: Mar. 15, 2005

(86) PCT No.: PCT/JP2005/005071

§ 371 (c)(1),
(2), (4) Date: Dec. 14, 2005

(87) PCT Pub. No.: WO2005/087566

PCT Pub. Date: Sep. 22, 2005

(65) Prior Publication Data

US 2006/0149445 A1 Jul. 6, 2006

(30) Foreign Application Priority Data

Mar. 15, 2004 (JP) ............................. 2004-073082

(51) Int. Cl.
*B62D 6/00* (2006.01)
(52) U.S. Cl. ........................................ 701/42; 303/140
(58) Field of Classification Search .................. 701/1, 701/37, 38, 41, 42, 48, 70, 72; 303/139, 303/140, 146
See application file for complete search history.

(56) References Cited

U.S. PATENT DOCUMENTS

| 4,998,593 | A | | 3/1991 | Karnopp et al. |
| 5,642,281 | A | * | 6/1997 | Ishida et al. ................... 701/41 |
| 6,164,150 | A | | 12/2000 | Shindo et al. |
| 6,208,921 | B1 | * | 3/2001 | Tsunehara et al. ............. 701/41 |
| 6,470,250 | B2 | * | 10/2002 | Nishizaki et al. .............. 701/48 |
| 6,584,397 | B2 | * | 6/2003 | Tanaka et al. .................. 701/70 |
| 2001/0011201 | A1 | * | 8/2001 | Nishizaki et al. .............. 701/41 |
| 2002/0030407 | A1 | | 3/2002 | Nishizaki et al. |
| 2003/0122417 | A1 | | 7/2003 | Hackl et al. |
| 2004/0200662 | A1 | * | 10/2004 | Tajima et al. ................ 180/402 |

FOREIGN PATENT DOCUMENTS

| JP | A 5-105055 | 4/1993 |
| JP | A 7-291141 | 11/1995 |
| JP | B2 2540742 | 7/1996 |

(Continued)

*Primary Examiner*—Dalena Tran
(74) *Attorney, Agent, or Firm*—Oliff & Berridge, PLC (57) ABSTRACT

A novel vehicle stability control device through steering wheels independently of the driver's handling operation is provided, in which a suitable steering angle parameter in determining a target value for a turning state parameter is selected. The control device calculates a provisional target steering angle for wheels based upon an amount of an operation of a driver and a predetermined steering characteristic; a target value for the turning state parameter; and a target steering angle for wheels for reducing a magnitude of a deviation of the actual turning state parameter from its target value when the magnitude of the deviation is at a reference value or above, and thereby controlling a steering angle based upon the target steering angle. During execution of controlling the steering angle based upon the target steering angle, the target value of the turning state parameter is calculated based upon the provisional target steering angle.

11 Claims, 4 Drawing Sheets

FOREIGN PATENT DOCUMENTS

| | | |
|---|---|---|
| JP | 08-310366 | 11/1996 |
| JP | 10-315997 | 12/1998 |
| JP | A-2001-219862 | 8/2001 |
| JP | A-2002-254964 | 9/2002 |
| JP | A-2003-137122 | 5/2003 |
| JP | A-2004-502587 | 1/2004 |
| WO | WO 02/02389 A1 | 1/2002 |
| WO | WO 2004/005093 A1 | 1/2004 |

\* cited by examiner

VEHICLE STABILITY CONTROL DEVICE

BACKGROUND OF THE INVENTION

1. Field of the Invention

The present invention relates to a device for controlling a behavior of a vehicle such as an automobile (a stability control), and more specifically, to such a device that stabilizes the running behavior of a vehicle by controlling a steering angle of wheels.

2. Description of Prior Art

There have been developed various control devices for stabilizing a running behavior of a vehicle in its yaw direction through generating a counter yaw moment of suppressing oversteering and understeering tendencies owing to an imbalance in braking or traction forces in the lateral direction of the vehicle, the saturation of a tire force, etc. Such a counter yaw moment, usually, is generated by controlling the tire force distribution in a vehicle. Further, in a vehicle equipped with a steering system enabling the steering of wheels independently of a driver's steering action, a counter yaw moment can be generated by an automatic steering of wheels. Examples of control devices for stabilizing a vehicle behavior through an automatic steering are disclosed in Japanese Patent Laid-Open Publication No. 5-105055 and Japanese Patent No. 2540742, in which a steering angle of wheels is controlled to generate a counter yaw moment against the yaw moment owing to a braking force imbalance between the left and right wheels on a vehicle, and thereby ensuring its straight line stability.

In control devices as described above, a degree of deterioration of a vehicle behavior, i.e. oversteering and understeering tendencies, is monitored by comparing an actual or measured value of a parameter indicating a turning state, such as a yaw rate, with the corresponding target value determined with operational parameters, such as a steering angle and a vehicle speed. Then, a counter yaw moment is generated to reduce the difference between the actual and target values of the turning state parameter by adjusting individual braking forces and/or the steering angle of wheels.

In the above-mentioned control strategies, the execution of the automatic steering for the stability control alters an actual steering angle from an angle determined with a driver's steering operation (the rotational angle of a steering wheel operated by a driver). Under an extreme condition where a large counter yaw moment is required for stabilizing a vehicle behavior, not only the magnitude but also the direction of the actual steering angle may be altered from those determined with the driver's steering operation. However, this fact is not taken into account in conventional control devices as described above. In these devices, an actual steering angle is always used for determining a target value for the turning state parameter, so that, if the actual steering angle is altered by the automatic steering control, the resultant behavior and/or tracking course of the vehicle would be deviated from those intended by the driver.

Accordingly, conventional vehicle stability control devices as described above may be improved to operate more appropriately, taking into account a steering angle variation under the automatic steering control.

SUMMARY OF INVENTION

According to the present invention, there is provided a novel vehicle stability control device for suppressing oversteering and understeering tendencies through controlling a steering angle of the vehicle, improved to execute a stability control more appropriately than ever by selecting a suitable steering angle parameter in determining a target value for a turning state parameter to be controlled.

In one aspect of the present invention, the inventive device may be equipped on a vehicle for controlling its running behavior. A steering apparatus of the vehicle is adapted to steer a wheel independently of a driver's steering operation. The inventive control device comprises a portion of calculating a target steering angle (provisional) for wheels based upon an amount of an operation of a driver, such as a rotational angle of a steering wheel rotated by a driver, and a predetermined steering characteristic; a detector of detecting an actual value of a turning state parameter, such as a yaw rate; and a portion of calculating a target value for the turning state parameter. The actual and target values of the turning state parameter are compared with each other. Then, if the magnitude of the deviation of the actual turning state parameter from its target value is at a reference value or above, the steering angle is controlled to be a target steering angle calculated for reducing the deviation of the turning state parameter. In this structure, according to the present invention, the target value of the turning state parameter during executing an automatic steering control for stabilizing a behavior is calculated based upon the target steering angle (provisional), not the actual one. In other words, as long as the automatic steering control is executed, the provisional target steering angle, namely the target steering angle determined based upon an amount of an operation of a driver and a predetermined steering characteristic, is selected as a parameter of a steering angle for determining a target turning state parameter.

The target value of the turning state parameter, determined as a function of a steering angle, determines the tracking course or direction of the vehicle, so that the driver's intention should be reflected in the target turning state parameter value. However, as noted, the actual steering angle under the automatic steering control is determined through the stability control for suppressing oversteering and understeering tendencies, so that the actual steering angle would not be completely consistent with the driver's intention. Thus, the provisional target steering angle determined based upon an amount of an operation of a driver is used in determining the target turning state parameter value during executing the automatic steering control.

In addition, it should be noted that the use of the provisional target steering angle in determining a target turning state parameter is advantageous for compensating for a delay in the response of the steering apparatus, since the resultant target turning state parameter is determined by a parameter not incorporating the delay of the steering apparatus. (The actual steering angle includes the effect of the delay of the steering apparatus.)

The provisional target steering angle may be calculated as a sum of a steering angle of wheels corresponding to the amount of the operation of the driver and a control steering angle for accomplishing a predetermined steering characteristic. In an embodiment, the provisional target steering angle may be determined as a function of a vehicle speed, and preferably varying with a steering gear ratio determined with the vehicle speed. The provisional target steering angle is determined e.g. through varying the ratio of the steering amount of wheels to the amount of rotation of the steering wheel (handle) of a driver, depending upon the vehicle speed.

In the above-mentioned structure, when no steering control of wheels based upon the target steering angle is executed, i.e. when the actual steering angle may be considered as resulting from the driver's operation without modification through a stability control, the target value of the turning state parameter may be calculated based upon the actual steering angle. Accordingly, in this case, the inventive device may comprise a detector of detecting an actual steering angle of wheels. If the magnitude of the deviation of the turning state parameter is lower than the reference value, the steering angle of wheels may be controlled through the steering apparatus based upon the provisional target steering angle.

In the inventive device, the control for stabilizing a vehicle behavior may be executed through not only the automatic steering but also adjusting individual braking and driving forces (tire forces) on the respective wheels. In this case, the inventive devices may further comprise a portion of controlling braking and driving forces on the respective wheels; a portion of calculating a total target amount of a stability control, such as a counter yaw moment, based upon the turning state parameter deviation for reducing the magnitude thereof, and a portion of dividing the total target stability control amount into target stability control amounts each for steering control of wheels and braking and driving force control, at a predetermined ratio. In this device, the target steering angle will be calculated based upon the target stability control amount of steering control of wheels and used for controlling the steering angle of wheels. Braking and driving forces on the respective wheels will be controlled based upon the corresponding target values calculated based upon the target stability control amount of braking and driving force control. The dividing of the total target amount of a stability control into target stability control amounts each for steering control of wheels and braking and driving force control may be done through calculation of yaw moments. It should be noted that, in the device executing both the automatic steering and adjusting individual tire forces, the target turning state parameter value will be determined as described above, so that the driver's intention is reflected therein.

By the way, when the steering apparatus becomes disabled from steering the wheels independently of a driver's steering operation due to any failure, no longer automatic steering will be executed. In such a case, the steering angle to be selected in determining the target turning state parameter may be the actual steering angle (because no modification of the steering angle is executed for a stability control). Further, the stability control will be executed only through adjusting tire forces on the respective wheels (i.e. the dividing portion assigns the total target stability control amount only to the target stability control amount for braking and driving force control.).

In this connection, in accordance with this strategy, the parameter of a steering angle in determining the target turning state will be changed from the provisional target steering angle to the actual steering angle if the automatic steering becomes disabled during executing a stability control. This change of the parameter of the steering angle would cause a stepwise variation in the target turning state parameter, leading to a disturbance in a vehicle running behavior. Thus, the inventive device may be designed to reduce the variation in the turning state parameter owing to the change of the steering angle used in calculating the target turning state parameter from the provisional target steering angle to the actual steering angle. The degree of the reduction of the variation in the turning state parameter may be larger at a higher vehicle speed than at a lower vehicle speed because, while the change of the parameter should be done as soon as possible, the disturbance of a behavior in a high speed vehicle should be avoided. In an embodiment, a smoothing process may be applied for a parameter of steering angle in determining the target turning state parameter.

Accordingly, it is an object of the present invention to provide new and novel vehicle stability control devices for a vehicle, such as automobile, by generating a counter yaw moment through the steering of wheels for stabilizing a behavior of the vehicle, taking into account that the steering angle could be changed independently of the driver's handling operation.

It is another object of the present invention to provide such devices operating more appropriately than ever by selecting a parameter of a steering angle in determining and controlling a target turning state, depending upon operational conditions.

It is a further object of the present invention to provide such devices improved for preventing erroneous operation of the device during executing a stability control.

Other objects and advantages of the present invention will be in part apparent and in part pointed out hereinafter.

BRIEF DESCRIPTION OF THE DRAWINGS

In the accompanying drawings.

DESCRIPTION OF PREFERRED EMBODIMENTS

Figure 1:
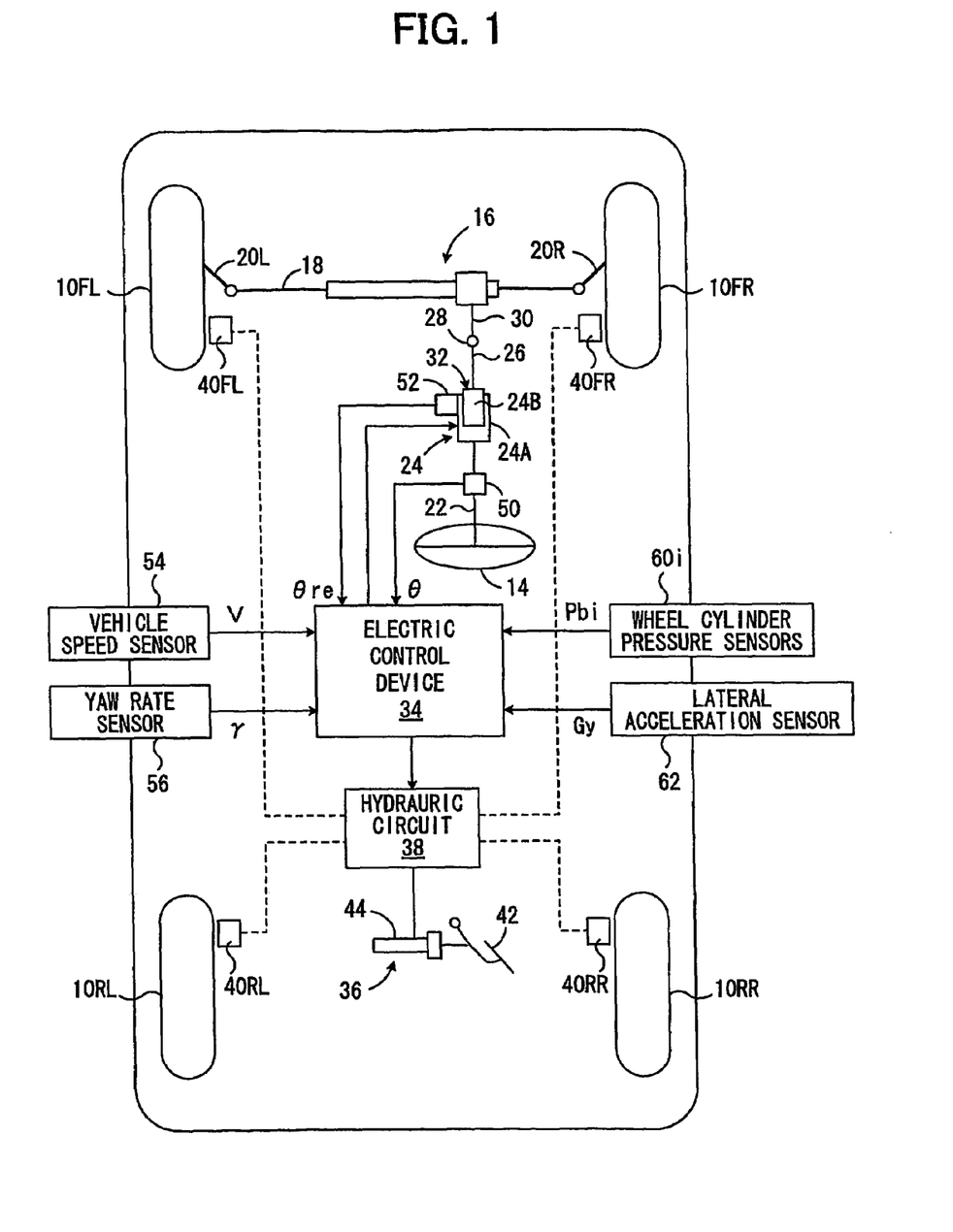
FIG. 1 is a diagrammatical view of a four wheeled, rear drive vehicle equipped with a turning angle varying apparatus of a semi-steer-by-wire type serving as an automatic steering apparatus and a vehicle stability control device according to the present invention.

FIG. 1 diagrammatically shows a four-wheeled, rear drive vehicle incorporating a preferred embodiment of a vehicle stability control device according to the present invention. In this drawing, a vehicle body 12 has left and right front wheels 10FL and 10FR, left and right rear-wheels 10RL, 10RR. As usual, the vehicle is formed to transmit a driving torque or a rotational driving force, outputted from an engine (not shown) according to a throttle valve opening in response to the depression of an acceleration pedal by a driver, to the rear wheels 10RL and 10RR through a differential gear system, etc. (not shown).

Front wheels 10FL, 10FR each are steered through tie rods 20L, R with a rack-and-pinion-type power-steering device 16 actuated in response to the rotation of a steering wheel 14 by a driver. For automatically steering the wheels, however, the steering device 16 employed here is of a semi-steer-by-wire type, provided with a turning angle varying apparatus 24 as an auxiliary steering apparatus which enables the control of the steering angle of the front wheels independently of the driver's handling.

The turning angle varying apparatus 24 includes a driving motor 32, having a housing 24A, operationally linking to the steering wheel 14 via an upper steering shaft 22, and a rotor 24B, operationally linking to a pinion shaft 30 via a lower steering shaft 26 and a universal joint 28. The driving motor 32 rotates the lower steering shaft 26 relative to the upper steering shaft 22 under the control of an electronic control 34 as described later. If any failure occurs in the rotational driving motion in the apparatus 24, the housing 24A and rotor 24B are mutually, mechanically locked by a locking device (not shown), preventing the relative rotation of the upper and lower steering shafts. For controlling the operation of the turning angle varying apparatus 24, a steering angle θ of the steering wheel 14, i.e. the rotational angle θ of the upper steering shaft 22, and a relative angle θre of the lower steering shaft 26 measured from the upper steering shaft 22 (between the housing 24A and rotor 24B) are detected with angular sensors 50 and 52, respectively.

The power steering device 16 may be either of hydraulic power steering type or of electric power steering type. However, for reducing a torque reaction transmitted from the apparatus 24 to the steering wheel 14 during the automatic steering control, preferably employed is a rack-coaxial type electric power steering device having a motor and a mechanism for converting the motor's rotational torque into a linear motional force of the rack bar 18.

A braking system 36, generating braking force on each wheel, has a hydraulic circuit 38 comprising a reservoir, an oil pump and various valves, etc.(not shown), wheel-cylinders 40FL, 40FR, 40RL and 40RR, equipped on the respective wheels, and a master cylinder 44 actuated in response to the depression of a brake pedal 42 by the driver. In the braking system, a braking pressure in each wheel cylinder, and in turn, the braking force on each wheel, are adjusted through the hydraulic circuit 38 in response to a master cylinder pressure. The braking pressure in each wheel cylinder may also be controlled by the electronic control 34 as described later. For controlling the braking pressures, pressure sensors 60i (i=FL, FR, RL, RR) for detecting the pressures Pbi (i=fl, fr, rl, rr) in the wheel-cylinders 40FR-40RL may be installed.

Electronic controller 34, controlling the turning angle varying apparatus 24 and the braking pressures (braking force) of the respective wheels, may be of an ordinary type, including a microcomputer having CPU, ROM, RAM, and input/output port devices, interconnected with the bidirectional common bus, and drive circuits. As seen from FIG. 1, inputted to the controller 34 are signals of: the steering angle θ of the steering wheel 14; the relative angle θre of the lower steering shaft; a vehicle speed V, detected with a vehicle speed sensor 54, or obtained from wheel velocities Vwi (i=fl, fr, rl and rr are front left, front right, rear left and rear right, respectively) detected with wheel velocity sensors (not shown); a yaw rate y, detected with a yaw rate sensor 56; a lateral acceleration Gy, detected with a lateral acceleration sensor 58; and pressures Pbi (i=fl, fr, rl, rr) in the wheel-cylinders 40FR-40RL.

The controller 34 executes a steering gear ratio control and a stability control through the automatic steering control and/or adjusting braking forces or pressures on the respective wheels.

Figure 3:
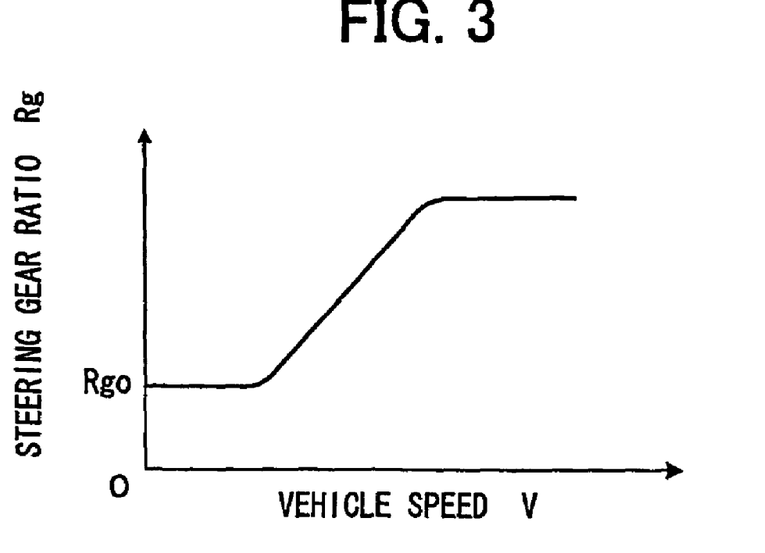
FIG. 3. shows a map of a relation between a vehicle speed V and a steering gear ratio Rg.

For the steering gear ratio control, the controller 34 controls the turning angle varying apparatus 24 through the rotation of the motor 32 to vary a steering gear ratio, i.e. the ratio of the steering angle of the front wheels to the rotational angle of the steering wheel 14, providing a predetermined steering characteristic. In operation, first, a steering gear ratio Rg for accomplishing a predetermined steering characteristic is determined in a portion in the controller 34 using a map shown in FIG. 3, based upon a vehicle speed V which may be calculated with the wheel velocities Vwi. Then, a target steering angle (provisional) δst is calculated by:

$$\delta st = \theta/Rg \tag{1},$$

and the turning angle varying apparatus 24 is actuated to steer the front wheels, adjusting their steering angle to δst. Thus, in this case, the turning angle varying apparatus 24 functions as a steering gear ratio varying apparatus.

In this connection, the target steering angle (provisional) δst is considered a sum of the steering angle corresponding to an actual amount of a driver's steering action (a rotational angle of the steering wheel 14), equal to θ/Rgo, and a control amount for obtaining a predetermined characteristic. δst may also be a function of a steering angler speed, for improving a transient response of the vehicle motion. It should be noted that the steering gear ratio may be determined in other ways known in the art.

For the stability control of suppressing understeering and oversteering tendencies, the controller 34 monitors the deviation of the actual yaw rate γ of the vehicle body from a target yaw rate γt, calculated using operational variables: a steering angle and a vehicle speed. The target yaw rate γt is a value theoretically expected on the vehicle with given operational variables, and therefore the deviation, Δγ(=γ−γt), of the actual yaw rate γ from the target yaw rate γt indicates the degree of the deviation of the actual condition from the theoretically expected condition: the degree of deterioration of the vehicle behavior. A counter yaw moment is generated to reduce the difference between the actual and target yaw rates by adjusting individual braking forces and/or the steering angle of wheels. Accordingly, in the illustrated embodiment, the yaw rate is employed as a turning state parameter.

Target yaw rate γt may be given as a function of a vehicle speed V and a steering angle δb as follows:

$$\gamma t = \frac{1}{(1+\tau \cdot s)} \cdot \frac{1}{1+K_h \cdot V^2} \cdot \frac{V}{H} \cdot \delta b, \tag{2}$$

where H is a wheel base; Kh, a stability factor; τ and s, a time constant and a frequency variable in Laplace transform. The detailed derivation of this formula may be found elsewhere.

With respect to the parameter δb of the steering angle in the expression (2), when no automatic steering is executed, an actual steering angle δa may be considered as coinciding with the provisional target steering angle, δst, determined based upon the driver's handling with exp. (1). Thus, the actual steering angle δa may be used as the parameter δb in exp. (2) in absence of automatic steering.

However, if automatic steering for a stability control is once started, the actual steering angle δa is changed from the provisional target steering angle δst. In this case, a target steering angle δt that the turning angle varying apparatus 24 is commanded to accomplish is given by:

$$\delta t = \delta st + \Delta \delta t \tag{3},$$

where Δδt is a modification of the steering angle in a stability control for suppressing a behavior deterioration. Accordingly, the actual steering angle δa is not always consistent with the driver's handling operation. Thus, in the inventive device, during the execution of the automatic steering for a stability control, the provisional target steering angle δst may be used as the parameter δb in exp. (2), and thereby rendering the driver's intention to be always reflected in the target yaw rate.

If any failure disabling automatic steering control occurs in the steering apparatus or in the turning angle varying apparatus 24, the upper and lower steering shafts are mutually locked. In this case, since no further automatic steering is executed, the actual steering angle δa will be used as the parameter δb in exp. (2).

Figure 4:
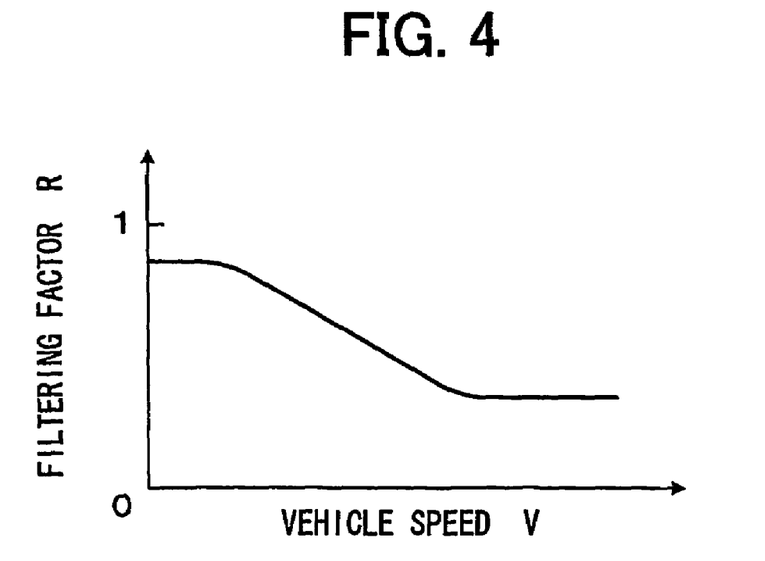
FIG. 4 shows a map of a filtering factor R, a function of a vehicle speed V.

In this regard, if any failure disabling automatic steering control occurs during the execution of the automatic steering for a stability control, the parameter δb in exp. (2) will be switched from the provisional target steering angle δst to the actual steering angle δa. However, this switching of the parameter δb could cause an abrupt variation of the target yaw rate value δt in exp. (2) because, usually, the actual steering angle δa coincides with δt(=≠st+Δδt). Then, in order to avoid such an abrupt variation of the parameter δb and the target yaw rate γt, an asymptotic (smoothing) process may be applied for the parameter δb: the parameter δb is rendered to change gradually. In repetitive cycles of the control routine as described below with a flowchart in FIG. 2, the parameter δb is given by:

$$\delta b = R \cdot \delta_{bn} + (1-R) \cdot \delta_{bn-1} \quad (4),$$

where $\delta_{bn}$ is a steering angle parameter to be selected in a current cycle and $\delta_{bn-1}$ is a steering angle parameter selected for calculating the target yaw rate γt in the last cycle. R is a filtering factor between 0 and 1, determined using a map in FIG. 4 as a function of the vehicle speed V. As seen from the map and exp. (4), the effect of suppressing the variation of the parameter δb increases as the vehicle speed increases because a larger variation in the target value should be avoid at a higher speed. According to the calculation (4), suppose the provisional target steering angle δst has been selected as the parameter in a certain cycle and the actual steering angle δa is selected in the subsequent cycle, δb is given by R·δa+(1−R)·δst. [δst in the last term may be given by exp. (4) in the preceding cycle.] This smoothing process may be always executed in repetitive cycles of the control routine.

Figure 2:
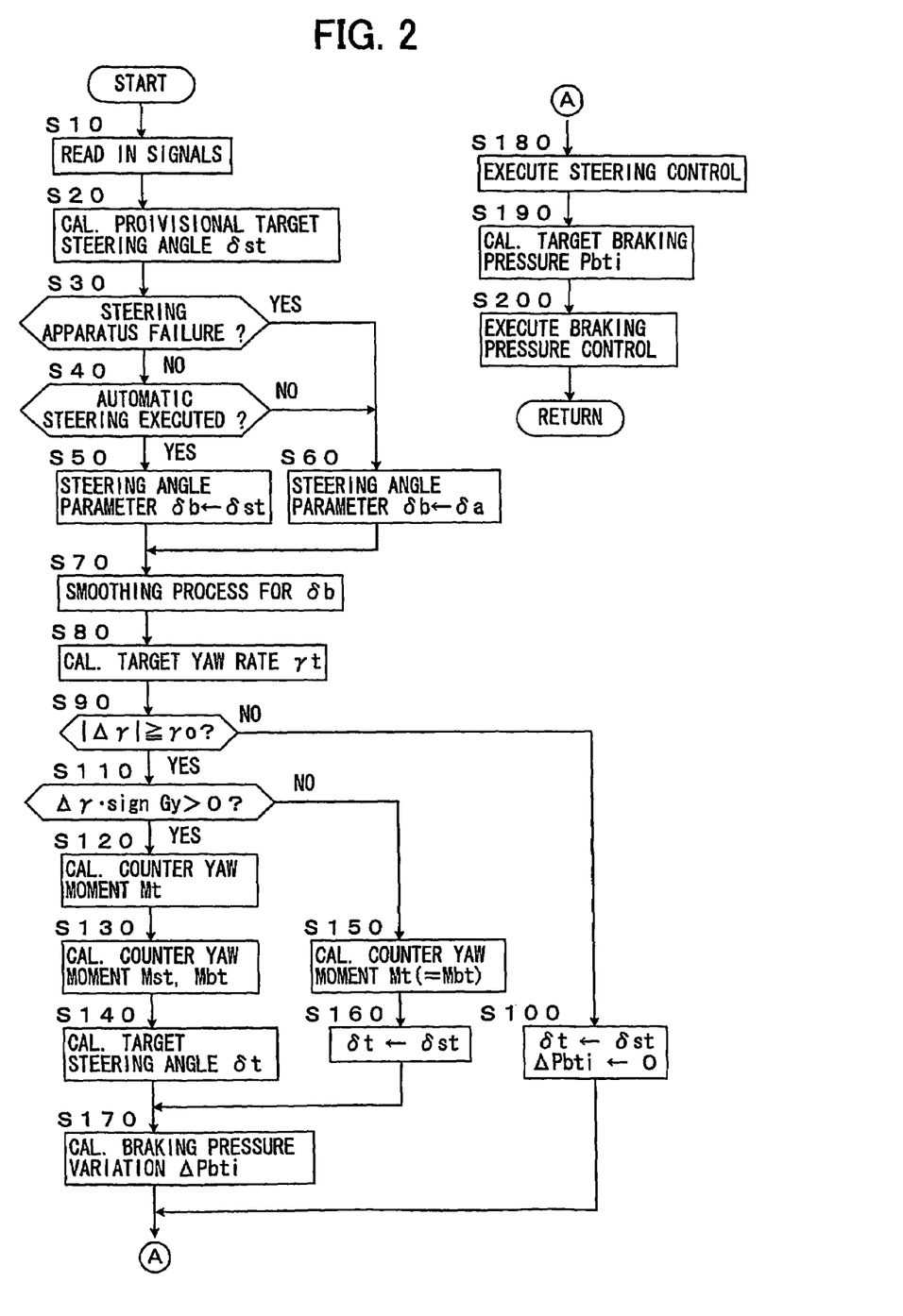
FIG. 2 is a flowchart of a vehicle stability control routine executed in the preferred embodiments in the vehicle in FIG. 1 according to the present invention for controlling the steering angle of the left and right front wheels and braking pressures for the respective wheels.

The flowchart in FIG. 2 shows an exemplary control routine for accomplishing the vehicle stability control in the inventive control device. In this embodiment, the automatic steering control independently of the driver's handling is executed [together with the adjusting of braking forces on the wheels] only when an oversteering tendency to be suppressed, or a spinning condition is detected. An understeering tendency, if detected, is suppressed only through the adjusting of braking forces as in a usual vehicle stability control. This is because lateral forces on front wheels of an understeering vehicle are often being saturated. Further, if any failure occurs in the steering apparatus, no automatic steering control is executed. In such a case, the stability control is executed only through the adjusting of the braking forces even when the vehicle is oversteering.

Referring to FIG. 2, the control routine may be started by a closure of an ignition switch (not shown in FIG. 1) and cyclically repeated at a cycle time such as milli-seconds during the operation of the vehicle.

In this routine, firstly, signals as described above are read-in (step 10) and the provisional target steering angle δst is determined with exp. (1), using a map as shown in FIG. 3 (step 20). Then, in steps 30-40, it is judged if any failure occurs in the steering apparatus (step 30) and if a stability control through the automatic steering is executed in the preceding cycle (step 40). As shown, when no failure occurs and a stability control through the automatic steering is executed, the provisional target steering angle δst is selected as the steering angle parameter δb to be used for the calculation of the target yaw rate γt (Step 50). Otherwise, the actual steering angle δa is selected as the steering angle parameter δb (Step 60). The actual steering angle δa may be directly measured with any appropriate sensor or estimated with the following:

$$\delta a = (\theta + \theta re)/Rg \quad (5)$$

Subsequently, in step 70, the smoothing process for the parameter of steering angle δb is executed using the expression (4) as described above, and the target yaw rate γt is calculated using the expression (2) in step 80.

Then, in steps 90, the degree of deterioration of the vehicle behavior is evaluated by judging if the absolute value of the difference of the actual and target yaw rates Δγ exceeds a reference value γo, a small positive constant. If no, no stability control is to be executed so that the provisional one δst is set for the target steering angle δt [and no braking pressure adjusting is executed] (step 100).

If |Δγ|≧γo, indicating that the behavior deterioration is advanced, whether the vehicle is oversteering or understeering is judged in step 110, e.g. by evaluating the amount of Δγ·signGy, where signGy is a sign of the lateral acceleration. If Δγ·signGy>0, the vehicle is oversteering; otherwise, the vehicle is understeering.

If the vehicle is oversteering, the counter yaw moment Mt is calculated in step 120 so as to reduce the deviation of the yaw rate Δγ, and divided into two components: one, Mbt to be generated through the adjusting of the braking forces on wheels; and the other, Mst to be generated through the automatic steering (in step 130). The division of the counter yaw moment may be done in one appropriate way realized by one of ordinary skill in the art. Then, in step 140, a target steering angle modification Δδt is calculated and the target steering angle δt is given by the expression (3), so as to generate the counter yaw moment component Mst.

On the other hand, if the vehicle is understeering, the counter yaw moment Mt is calculated in step 150 and the target steering angle δt is set to the provisional one δst in step 160 because no automatic steering control is executed in this case. Set for the counter yaw moment Mt will be a yaw moment component, Mbt, to be generated through the adjusting of the braking forces on wheels.

Then, in step 170, modification amounts of braking pressures on the respective wheels ΔPbti (i=fl, fr, rl and rr) are calculated so as to generate a yaw moment component Mbt in one appropriate way, realized by one of ordinary skill in the art.

Fianlly, the steering angle is adjusted to the target steering angle δt (step 180) and the braking pressure control is executed in steps 190 and 200. In step 190, the braking pressure Pbti for each wheel may be given e.g. by:

$$Pbti = Ki \cdot Pm + \Delta Pbti \quad (6),$$

where Pbti, Ki are a target braking pressure and a conversion factor for each wheel, respectively; Pm, a master cylinder pressure. It should be noted that the control of braking pressure may be executed in any other way known in the art as far as the component Mbt is generated. Steps 190 and 200 may be executed prior to step 180.

After the execution of step 200, the control routine returns to the Start and the next cycle is started.

In the above-described routine, it should be noted that the provisional target steering angle δst is selected as the steering angle parameter δb only when the automatic steering control is executed in the preceding cycle. If no automatic steering control is executed or an automatic steering control is ceased in the preceding cycle, the actual steering angle δa is employed as the steering angle parameter δb for calculation of the target yaw rate γt.

In this connection, normally, the actual steering angle δa is rendered to be substantially coincident with the provisional target steering angle δst. Thus, under normal conditions in absence of any failure, the provisional target steering angle δst may be always selected as the steering angle parameter δb. However, when a failure occurs in the motion of the steering apparatus, usually, the upper and lower steering shafts are locked at any non-neutral position, i.e. the position of θre ≠θ. In such a case, the provisional target steering angle δst can significantly differ from the actual steering angle δa. Thus, when any failure occurs in the steering apparatus, the actual steering angle δa is always selected as the steering angle parameter δb.

Further, it should be noted that the selecting of the provisional target steering angle δst under execution of the automatic steering control can also compensate for the mechanical delay in the actuation of the steering apparatus during the automatic steering control. During the automatic steering control, it is possible that the steering apparatus is requested to actuate the tie rods for the front wheels relatively quickly (at a large amount per one cycle). In such a case, the motion of the actual steering angle δa could be delayed relative to the variation of the target steering angle δt. However, if the target yaw rate γt is calculated with the provisional target steering angle δst, the delay of the motion of the actual steering angle δa will not contribute to the calculation (Rather, the following-up action of the steering apparatus will be improved.).

Although the above routine is designed to always execute the smoothing process for the parameter δb, that process may be executed only after the switching of the parameter and/or the excessive variation of the parameter occur. However, normally, since the variations of the actual steering angle δa and the modification amount Δδt are smooth, the variation of the parameter δb is not excessively smoothed out.

Figure 5:
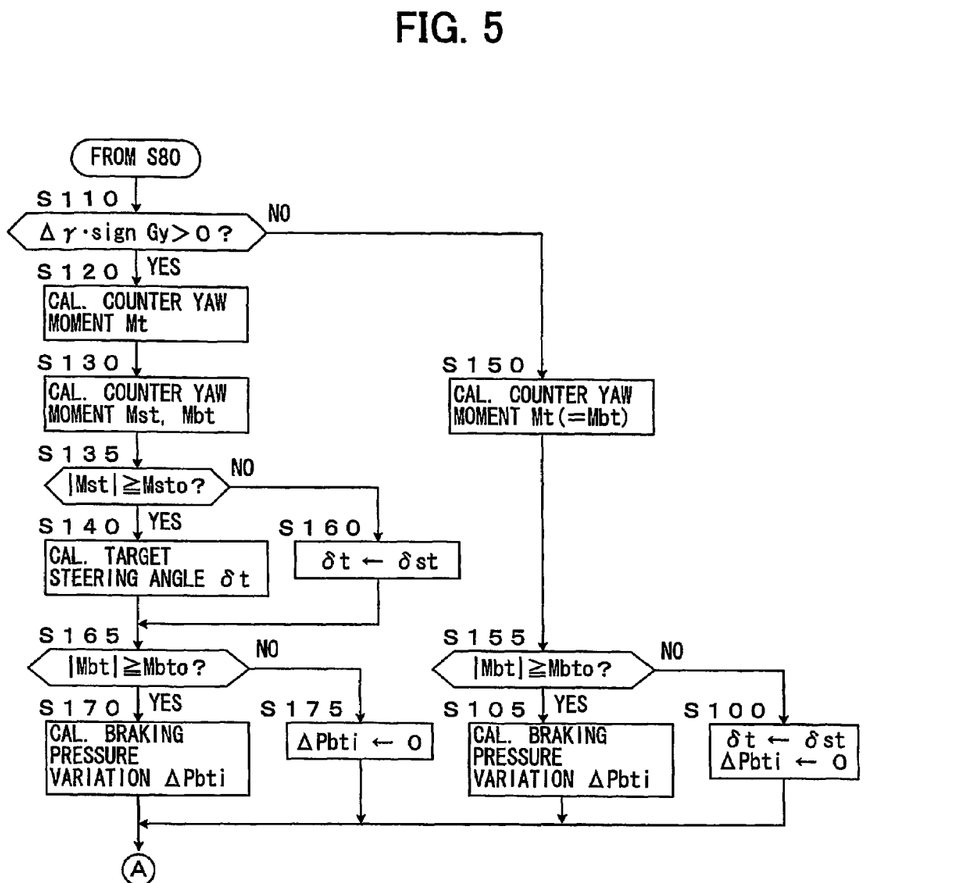
FIG. 5 is a partial flowchart of a modification of the flowchart shown in FIG. 2.

Moreover, the routine may be designed to execute the automatic steering control and/or the adjusting of braking forces only when the magnitudes of the respective counter yaw moment components Mst, Mbt exceed the corresponding reference values Msto, Mbto (>0) as shown in FIG. 5.

Although the present invention has been described in detail with respect to preferred embodiments thereof and some partial modifications thereof, it will be apparent for those skilled in the art that other various modifications are possible with respect to the shown embodiments within the scope of the present invention.

For instance, the inventive control device may be employed in a front drive vehicle and a four wheel drive vehicle. As a steering apparatus, a full steer-by-wire power steering system may be employed. Further, the automatic steering control may be applied for steering rear wheels.

The invention claimed is:

1. A device for controlling a behavior of a vehicle having a vehicle body, wheels and a steering apparatus that can steer the wheel independently of a driver's steering operation, the device comprising:
 a portion for calculating a provisional target steering angle for the wheels based upon an amount of a steering operation of the driver and a predetermined steering characteristic;
 a detector for detecting an actual value of a turning state parameter;
 a portion for calculating a target value for the turning state parameter;
 a portion for calculating a target turning state control steering angle for the wheels for reducing a magnitude of a deviation of the actual turning state parameter from the target value for the turning state parameter when the magnitude of the deviation is at or above a reference value; and
 a portion for controlling a steering angle of the wheels based upon a final target steering angle incorporating therein the driver's steering operation, the predetermined steering characteristic and the reduction of the magnitude of the deviation of the actual turning state parameter from the target value for the turning state parameter when the magnitude of the deviation is at or above the reference value, and
 wherein the target turning state parameter calculating portion calculates the target value for the turning state parameter by using the provisional target steering angle as a parameter representing a steered angle of the wheels.

2. The device according to claim 1, wherein, when the magnitude of the deviation of the turning state parameter is lower than the reference value, the steering angle controlling portion controls the steering angle of the wheels through the steering apparatus by using the provisional target steering angle as the final target steering angle.

3. The device according to claim 2, further comprising:
 a detector for detecting an actual steering angle of the wheels,
 wherein the target turning state parameter calculating portion calculates the target value for the turning state parameter based upon the target actual steering angle when no steering control of the wheels based upon the target turning state control steering angle is executed.

4. The device according to claim 2, wherein the provisional target steering angle is a sum of a steering angle of the wheels corresponding to the amount of the steering operation of the driver and a control steering angle for accomplishing the predetermined steering characteristic.

5. The device according to claim 1, further comprising:
 a detector for detecting an actual steering angle of the wheels,
 wherein the target turning state parameter calculating portion calculates the target value for the turning state parameter based upon the target turning state control steering angle when no steering control of wheels based upon the target steering angle is executed.

6. The device according to claim 5, wherein the provisional target steering angle is a sum of a steering angle of the wheels corresponding to the amount of the steering operation of the driver and a control steering angle for accomplishing the predetermined steering characteristic.

7. The device according to claim 1, wherein the provisional target steering angle is a sum of a steering angle of the wheels corresponding to the amount of the steering operation of the driver and a control steering angle for accomplishing the predetermined steering characteristic.

8. The device according to claim 1, further comprising:
 a portion for controlling braking and driving forces in the respective wheels;
 a portion for calculating a target amount of a stability control based upon the turning state parameter deviation for reducing the magnitude thereof;
 a portion for dividing the target stability control amount into a stability control for steering the wheels and a target stability control braking and driving force amount of operating the braking and driving force controlling portion at a predetermined ratio;
 a portion for calculating the final target steering angle based upon the driver's steering operation, the predetermined steering characteristics and the target stability control steering amount,
 wherein the steering angle controlling portion controls the steering angle of the wheels based upon the thus calculated final target steering angle through the steering apparatus; and the braking and driving force controlling portion controls braking and driving forces in the respective wheels based upon the target stability control braking and driving force amount.

9. The device according to claim 8, further comprising:
a detector for detecting an actual steering angle of the wheels,
wherein when the steering apparatus cannot steer the wheels independently of the driver's steering operation, the target turning state parameter calculating portion calculates the target turning state parameter based upon the actual steering angle, and the target stability control amount dividing portion assigns the target stability control amount only to the target stability control braking and driving force amount.

10. The device according to claim 9, wherein, when the steering apparatus becomes disabled from steering the wheels independently of the driver's steering operation during the calculation of the target turning state parameter based upon the provisional target steering angle in the target turning state parameter calculating portion, the variation of the turning state parameter owing to the change of the steering angle used in calculating the target turning state parameter from the provisional target steering angle to the actual steering angle is lessened.

11. The device according to claim 10, wherein a degree of the lessening of the variation in the turning state parameter is larger at a higher vehicle speed than at a lower vehicle speed.

* * * * *